United States Patent
Parashar et al.

(10) Patent No.: US 9,973,569 B2
(45) Date of Patent: *May 15, 2018

(54) SYSTEM, METHOD AND COMPUTING APPARATUS TO MANAGE PROCESS IN CLOUD INFRASTRUCTURE

(71) Applicant: CELLOS SOFTWARE LTD, Melbourne (AU)

(72) Inventors: Tarun Parashar, Delhi (IN); Anurag Srivastav, Delhi (IN)

(73) Assignee: Cellos Software Ltd., Melbourne (AU)

( * ) Notice: Subject to any disclaimer, the term of this patent is extended or adjusted under 35 U.S.C. 154(b) by 156 days.

This patent is subject to a terminal disclaimer.

(21) Appl. No.: 14/624,196

(22) Filed: Feb. 17, 2015

(65) Prior Publication Data
US 2015/0244780 A1  Aug. 27, 2015

Related U.S. Application Data

(60) Provisional application No. 61/942,710, filed on Feb. 21, 2014.

(51) Int. Cl.
| | |
|---|---|
| *G06F 15/16* | (2006.01) |
| *H04L 29/08* | (2006.01) |
| *G06F 9/54* | (2006.01) |

(52) U.S. Cl.
CPC ............ *H04L 67/10* (2013.01); *G06F 9/54* (2013.01); *H04L 67/145* (2013.01)

(58) Field of Classification Search
CPC .......... H04L 67/10; H04L 67/145; G06F 9/54
USPC ...................................................... 709/201
See application file for complete search history.

(56) References Cited

U.S. PATENT DOCUMENTS

| | | | | |
|---|---|---|---|---|
| 7,747,717 B2* | 6/2010 | Colrain | ................. | G06F 9/5061 709/204 |
| 8,862,743 B1* | 10/2014 | Petrescu-Prahova | . | G06F 9/5077 709/219 |
| 9,218,245 B1* | 12/2015 | MacDonald McAlister | ........... | G06F 11/1471 |
| 9,380,108 B2* | 6/2016 | Kataoka | .............. | H04L 67/1008 |
| 9,455,894 B1* | 9/2016 | Neelam | ................... | H04L 43/10 |
| 2002/0112196 A1* | 8/2002 | Datta | .................... | H04L 41/042 714/4.11 |
| 2008/0005281 A1* | 1/2008 | Hsueh | ................. | G06F 11/0709 709/219 |

(Continued)

*Primary Examiner* — Joseph E Avellino
*Assistant Examiner* — Binod J Kunwar
(74) *Attorney, Agent, or Firm* — Shumaker, Loop & Kendrick, LLP

(57) ABSTRACT

A system, method and computing apparatus to manage process(es) in a cloud computing infrastructure are provided. Application nodes are connected to at least one administration node in a cloud computing infrastructure. The application nodes are configured upon instruction from the administration node to run a process or set of processes for at least one service, to perform the following: initiating a first process on each of the application node by at least one of the administration node; initiating at least one process other than the first process on each of the application nodes by the first process through a first procedure; monitoring operational statuses of all the processes other than the first process through the first procedure, by the first process in each of the application nodes; and the status of all the processes other than the first process is communicated to the at least one administration node.

12 Claims, 10 Drawing Sheets

(56) References Cited

U.S. PATENT DOCUMENTS

| | | | |
|---|---|---|---|
| 2010/0167658 A1* | 7/2010 | Hoffman | H04W 24/08 455/67.11 |
| 2010/0332622 A1* | 12/2010 | Carolan | G06F 9/5072 709/220 |
| 2011/0276685 A1* | 11/2011 | de Waal | G06F 9/5072 709/224 |
| 2012/0143887 A1* | 6/2012 | Fontenot | H04L 61/2092 707/758 |
| 2012/0221700 A1* | 8/2012 | Dutta | H04L 43/0817 709/223 |
| 2013/0007252 A1* | 1/2013 | Welin | H04L 41/0213 709/223 |
| 2013/0066923 A1* | 3/2013 | Sivasubramanian | G06F 17/30306 707/802 |
| 2013/0128749 A1* | 5/2013 | Krzanowski | H04L 41/0213 370/241.1 |
| 2013/0198350 A1* | 8/2013 | Moore | H04L 29/06 709/221 |
| 2013/0339981 A1* | 12/2013 | Ishibashi | G06F 9/544 719/312 |
| 2014/0047106 A1* | 2/2014 | Leung | H04L 43/08 709/224 |
| 2014/0078182 A1* | 3/2014 | Utsunomiya | G09G 5/37 345/666 |
| 2015/0109938 A1* | 4/2015 | Zhang | H04L 43/10 370/241.1 |
| 2015/0271132 A1* | 9/2015 | Erb | H04L 61/1511 709/223 |
| 2016/0006643 A1* | 1/2016 | Fukuda | H04L 45/42 370/237 |

\* cited by examiner

SYSTEM, METHOD AND COMPUTING APPARATUS TO MANAGE PROCESS IN CLOUD INFRASTRUCTURE

CROSS-REFERENCE TO RELATED APPLICATION

This application claims the benefit of priority under 35 U.S.C. § 119(e) to U.S. Provisional Patent Application Ser. No. 61/942,710 filed on Feb. 21, 2014.

TECHNICAL FIELD

The present invention relates to management of processes in a cloud computing infrastructure, and more particularly it relates to a system, a method and a computing apparatus to monitor the operational status of the processes and manage the processes in cloud computing infrastructure.

BACKGROUND

The advent of cloud-based computing architectures has opened new possibilities for the rapid and scalable deployment of virtual web stores, media outlets, and other on-line sites or services. Generally speaking, cloud computing involves delivery of computing as a service rather than a product, whereby shared resources (software, storage resources, etc.) are provided to computing devices as a service. The resources are shared over a network, which is typically the internet. In a cloud computing system, there is a plurality of physical computing machines generally known as nodes. These nodes are connected with each other, either via a high speed local area network or via a high speed bus connection to form a cloud computing infrastructure. The operator of the cloud computing infrastructure provides services to many users such as user computing devices connected to the cloud computing infrastructure via internet. A user or customer can request the instantiation of a node or set of nodes from those resources from a central server or management system to perform intended services or applications. Usually, each service includes several processes running on different nodes and each node may have multi-core processors for simultaneously running multiple processes.

In a cloud computing infrastructure, there is a parent process conventionally initiated and configured in each node to initiate child processes on the same node. Also, the parent process is configured to monitor, maintain, update, restart or delete the child processes such as user application binary or user binary. In fact, the process may be created in any node for the aforementioned functionality of monitoring, managing, updating, initiating, restarting or deleting child processes in each node. Furthermore, the parent process in each node may initiate and restart the child processes according to commands or instructions of the centralized management software or the management entity in the cloud computing infrastructure.

In a conventional cloud system discussed above, it is usually the parent process in each node which directly initiates the child process and stores the process ID assigned by the operating system of the node. In such a case, the parent process has to maintain an inline table containing the "parent-child" relationship between each process name and its corresponding process ID for the node at which the parent process is operating. The process ID of the child process is assigned by the Operating System Kernel of the node, when the child process is firstly initiated. However, such monitoring and management of child processes at the parent process end may be vulnerable when the parent process goes down unexpectedly. In the event of parent process going down accidentally, it is difficult for the particular parent process to recollect the process ID of its child processes. In other words, the "parent-child" relationship is lost when the parent process experiences failure. In order to address said problem presently, an offline database is used which stores the mapping relationship between each process name and its corresponding process ID but it is more expensive in terms of both capital expense and operational expense of the whole cloud computing system.

In this context, there is a need for solutions to provide a method or a system to manage the processes in each node in the cloud computing infrastructure. The solution should at least enable the first process to resume its monitoring activity after the first process goes down accidentally and then determines the operational status of each child processes created by itself.

SUMMARY

The object of the proposed invention is to provide a system, a method and a computing apparatus to manage processes such as application binary or user binary in a cloud computing infrastructure.

According to a first aspect of the invention, there is provided a system adapted to manage processes in a cloud computing infrastructure. The system comprises at least one administration node; and a plurality of application nodes, connected to at least one of the administration node. Further, the application nodes are configured upon receiving instruction from the at least one administration node to run at least one process for a service for initiating a first process on each of the application by at least one of the administration node. The system is further configured for initiating at least one process other than the first process on each of the application node by the first process through a first procedure. Thereafter, the operational status of all the processes other than the first process is monitored through the first procedure, by the first process in each of the application nodes. Finally, the status of all the processes other than the first process is communicated to the at least one administration node.

According to an embodiment of the invention, each of the plurality of application nodes is connected with at least one of other application nodes.

In one embodiment of the invention, the administration node comprises a management process module, comprising a configuration database storing configuration data of all the processes initiated in the cloud computing infrastructure.

In yet another aspect of the invention, the first procedure is an asynchronous event-based procedure configured to initiate at least one process during a system boot, stop at least one initiated process during a system shutdown, and monitor the at least one initiated process while the system of the application node, on which the first process is initiated, is still running.

In another embodiment of the invention, the first process to be initiated on any of the plurality of application node is a network monitoring process entity, which is configured to obtain the configuration data from said configuration database and create a process list to be initiated on any of the application node on which the first process is operating.

In yet another embodiment of the invention, network monitoring process entity of any of the plurality of application nodes determines the process information of all the processes initiated on any of the application node on which the first process is operating.

In one aspect of the invention, the network monitoring process entity continuously monitors the operational status of all the processes initiated on any of the application node on which the first process is operating.

In further embodiment of the invention, the network monitoring process entity of each of the plurality of application nodes communicates the operational status and process information to the at least one administration node.

In yet another embodiment of the present invention, the at least one administration node communicates the operational status received to all the other application nodes.

In one embodiment of the invention, the plurality of application nodes comprises a cloud platform thin layer configured to communicate with the at least one administration node and at least one of the other application nodes.

In yet another aspect of the invention, the at least one administration node comprises a cloud platform administration layer configured to communicate with the plurality of application nodes.

According to another aspect of the invention, there is provided a method to manage processes in a cloud computing infrastructure. The method comprises steps of: initiating, at each of the application nodes, a first process by the at least one administration node. Further, obtaining at each of the application nodes, configuration information by the first process from a configuration database of the at least one administration node. Thereafter, initiating, at each of the application nodes, at least one process other than the first process through a first procedure. Monitoring, at each of the application nodes, the operational status of the at least one process other than the first process, through the first procedure by the first process. Lastly, communicating, at each the application nodes the operational status of the at least one process other than the first process to the at least one administration node.

In yet another embodiment of the invention, once the first process is initiated on each of the plurality of application nodes, the method further comprises: obtaining, by the first process configuration data from the configuration database and creating a process list to be initiated on each of the plurality of application nodes on which the first process is running.

In one embodiment of the invention, the method further comprises: initiating a network monitoring process entity as the first process on each of the plurality of application nodes by a management process module of the at least one administration node.

In yet another aspect of the invention, the first procedure is an asynchronous event-based procedure configured to initiate at least one process during a system boot, stop at least one initiated process during a system shutdown, and monitor the at least one initiated process while the system of the application node, on which the first process is initiated, is still running.

In a further embodiment of the invention, the method further comprises: determining, the process information of all the processes initiated on any of the application node, on which said network monitoring process entity is running by the said network monitoring process entity of each of the plurality of application nodes.

In one embodiment of the invention, the method further comprises: continuously monitoring the operational status of all the processes initiated by the network monitoring process entity on any of the application node on which the first process is operating.

In yet another embodiment of the invention, the method further comprises: communicating the operational status and process information to at least one of the administration node by the network monitoring process entity of each of the plurality of application nodes.

In another aspect of the invention, the method further comprises: communicating the received operational status to all the other application nodes by the at least one administration node.

In a further embodiment of the invention, the method further comprises: monitoring by the administration node, the first process; and monitoring, by the first process of each of the plurality of application nodes, respectively the at least one process other than the first process via the first procedure of an operating system in each of the plurality of application nodes of the first process.

In yet another embodiment of the invention, the method further comprises: shutting down, by the first process, any process other than the first process according to a shutdown command from the management process module.

In one embodiment of the invention, the method further comprises: acquiring, by the first process, configuration information of the at least one process other than the first process from one of the at least one administration node. Then, initiating, respectively the at least one process other than the first process according to their respective configuration information via the first procedure. Further, monitoring respectively the at least one process other than the first process via the first procedure of the operating system in each of the plurality of application nodes. Thereafter, reporting respectively the operational status of the at least one process other than the first process to the management process module when the at least one process other than the first process is successfully initiated.

In yet another embodiment of the invention, the method further comprises: determining, by one of the at least one administration node, whether the first process of one of the plurality of application nodes goes down. Further, when it is determined that the first process goes down, restarting the first process by the administration node on one of the plurality of application nodes and configuring the first process to monitor the at least one process other than the first process.

In an embodiment of the invention, the step of initiating the at least one process other than the first process on each of the plurality of application nodes via an first procedure comprises: configuring, by the first process, the first procedure to respectively initiate the at least one process other than the first process. The method then comprises configuring, by the first process, a local process identifier for each successfully initiated process other than the first process on each of the plurality of application nodes. Further, configuring, by the first process, a process name of each successfully initiated process from its configuration information. Then, configuring, by the first process, to store in a memory allocation the process name and the local process identifier for each successfully initiated process.

In yet another embodiment of the invention, once the first process is restarted, the method further comprises: acquiring the configuration information of the at least one process other than the first process currently running in each of the plurality of application nodes from the administration node. Thereafter, acquiring the process name of the at least one process other than the first process from their respective configuration information. And then, requesting the first procedure to respectively report the operational status of the at least one process other than the first process according to the acquired process name.

In further embodiment of the invention, the communication between the application nodes with the at least one administration node and the other application nodes is through a cloud platform thin layer.

In yet another embodiment of the invention, the communication between the administration node with the application nodes is through a cloud platform administration layer.

According to yet another aspect of the invention, there is provided a cloud computing apparatus. The apparatus comprises a networking interface, connected to an administration node and other cloud computing apparatus in a cloud computing infrastructure; a cloud platform thin layer entity, connected with the networking interface, and is configured to perform the following steps of: initiating, at each of the application nodes, a first process by the at least one administration node; obtaining at each of the application nodes, configuration information by the first process from a configuration database of the at least one administration node; initiating, at each of the application nodes, at least one process other than the first process through a first procedure; monitoring, at each of the application nodes, the operational status of the at least one process other than the first process, through the first procedure by the first process; and communicating, at each the application nodes the operational status of the at least one process other the first process to the at least one administration node.

In another aspect of the invention, the first procedure is an asynchronous event-based procedure configured to initiate at least one process during a system boot, stop at least one initiated process during a system shutdown, and monitor the at least one initiated process while the system of the application node, on which the first process is initiated, is still running.

BRIEF DESCRIPTION OF THE DRAWINGS

Other features, objects and advantages of the present invention will be apparent by reading the following detailed description of non-limiting exemplary embodiments with reference to appended drawings.

DETAILED DESCRIPTIONS OF EXEMPLARY EMBODIMENTS

Figure 1:
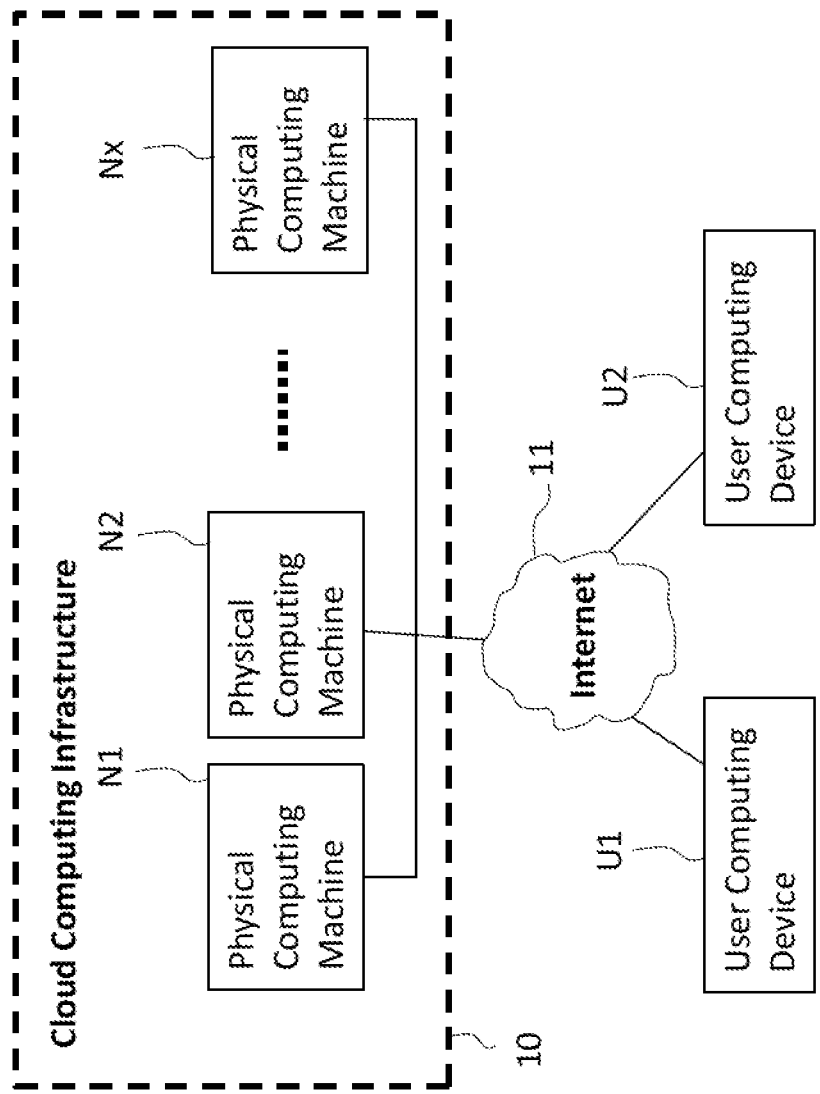
FIG. 1 illustrates a conventional cloud computing system.

FIG. 1 illustrates a conventional computing cloud system. In a cloud computing system there are a plurality of physical computing machines N1, N2, . . . Nx logically connected to each other and referred as nodes N1, N2, . . . Nx in the present disclosure. These nodes N1, N2, . . . Nx are connected to each other either via high speed local area network or via high speed bus connections to form a cloud computing infrastructure 10. The operator of the cloud computing infrastructure 10 provides services to many users such as user computing devices U1, U2 connected to the cloud computing infrastructure 10 via internet 11. Generally, each service may include plurality of processes running in any of the nodes N1, N2, . . . Nx, and each node may have multi core processors for running multiple processes simultaneously.

Figure 2:
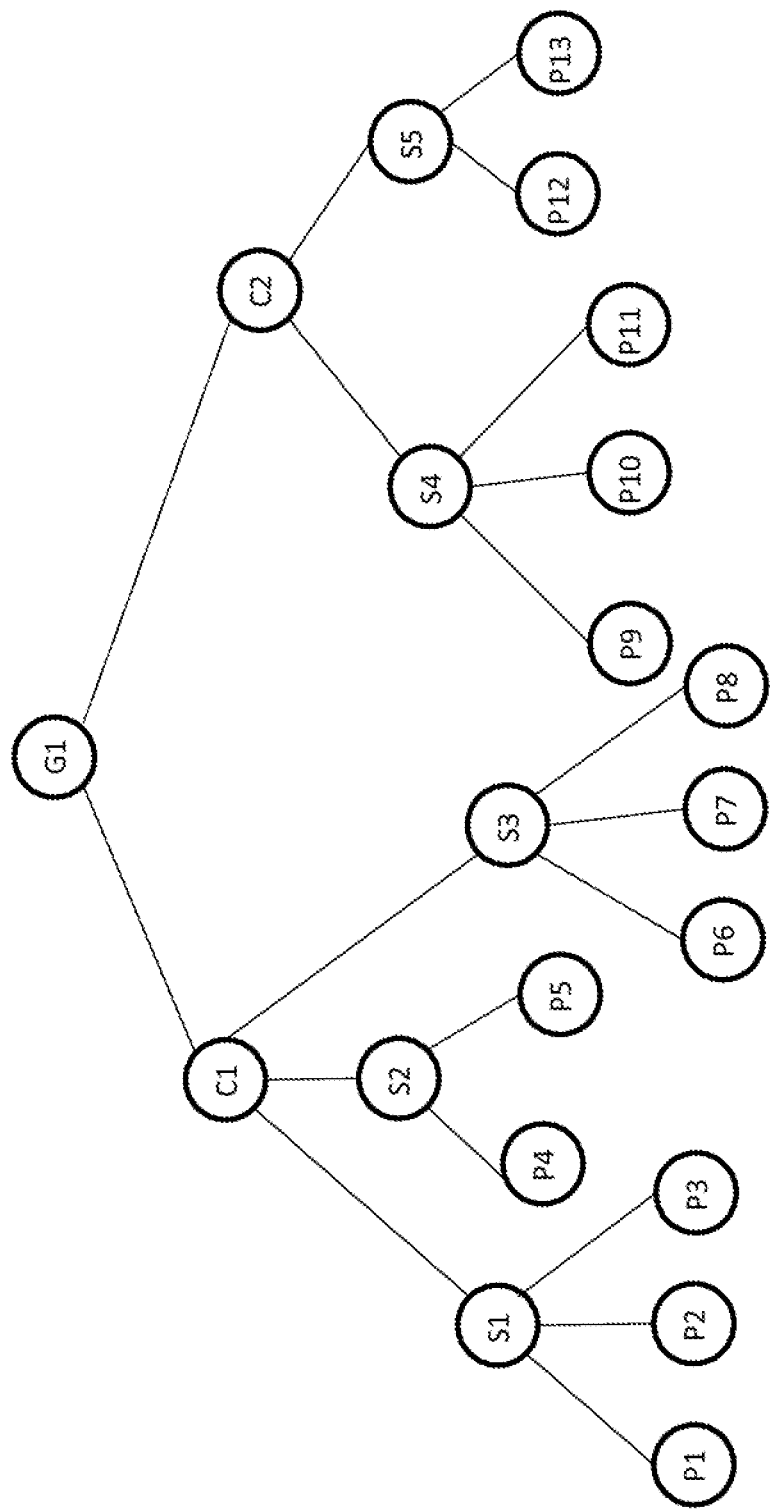
FIG. 2 is a schematic diagram illustrating an exemplary logical structure of the services and their respective processes running on multiple nodes in the cloud computing infrastructure.

FIG. 2 illustrates an exemplary logical structure of the services and their respective processes running on multiple nodes in the cloud computing infrastructure 10. In a cloud computing infrastructure there is provided a logical node G1, which represents a group of services that is to be provided to a particular user or a particular set of users. The said node G1, may include multiple clusters of services C1, C2, . . . Cn. Further, under the cluster C1 there are multiple service objects S1, S2, S3 and similarly, under the cluster C2, there are multiple service objects S4, S5. Further down the hierarchal structure there are provided set of processes P1, P2 and P3 under the service S1 to enable the basic computational functions of the service S1. Similarly, processes P4 and P5 functions for the service S2; processes P6, P7, P8 under the service S3; processes P9, P10, P11 under the service S4; and processes P12, P13 under the service S5.

In practice, the cloud computing infrastructure 10 includes several groups respectively including several clusters; under each cluster, there are several services; and there are a large number of processes running simultaneously for each service resulting in complicated structure of the cloud computing infrastructure 10. The complicated nature of the cloud computing infrastructure 10 may be intensified when hundreds of processes belonging to the same services spread over multiple nodes N1, N2, . . . Nx. In order to manage such complex cloud computing infrastructure 10, there is provided a centralized management software or management entity, which controls the overall system computation efficiency of the cloud computing infrastructure 10 by initiating, suspending, shutting down, restarting processes or migrating processes from one node to another node for each service. However, when there are many processes under each service instance of services such as S1, S2, S3, S4, S5; and each process may experience failure or be initialized, suspended, shutdown, restarted or migrated from one node to another node very frequently, it is anticipated that each service instance may be unable to track the network layer/ Internet addresses along with port numbers of processes to which they belong.

Therefore, there is required a system which can address the problems with respect to monitoring and maintaining processes in each node in the cloud computing infrastructure 10. Accordingly, the present invention proposes a method, a computing apparatus and a system to manage processes on each node in the cloud computing infrastructure 10.

Figure 3:
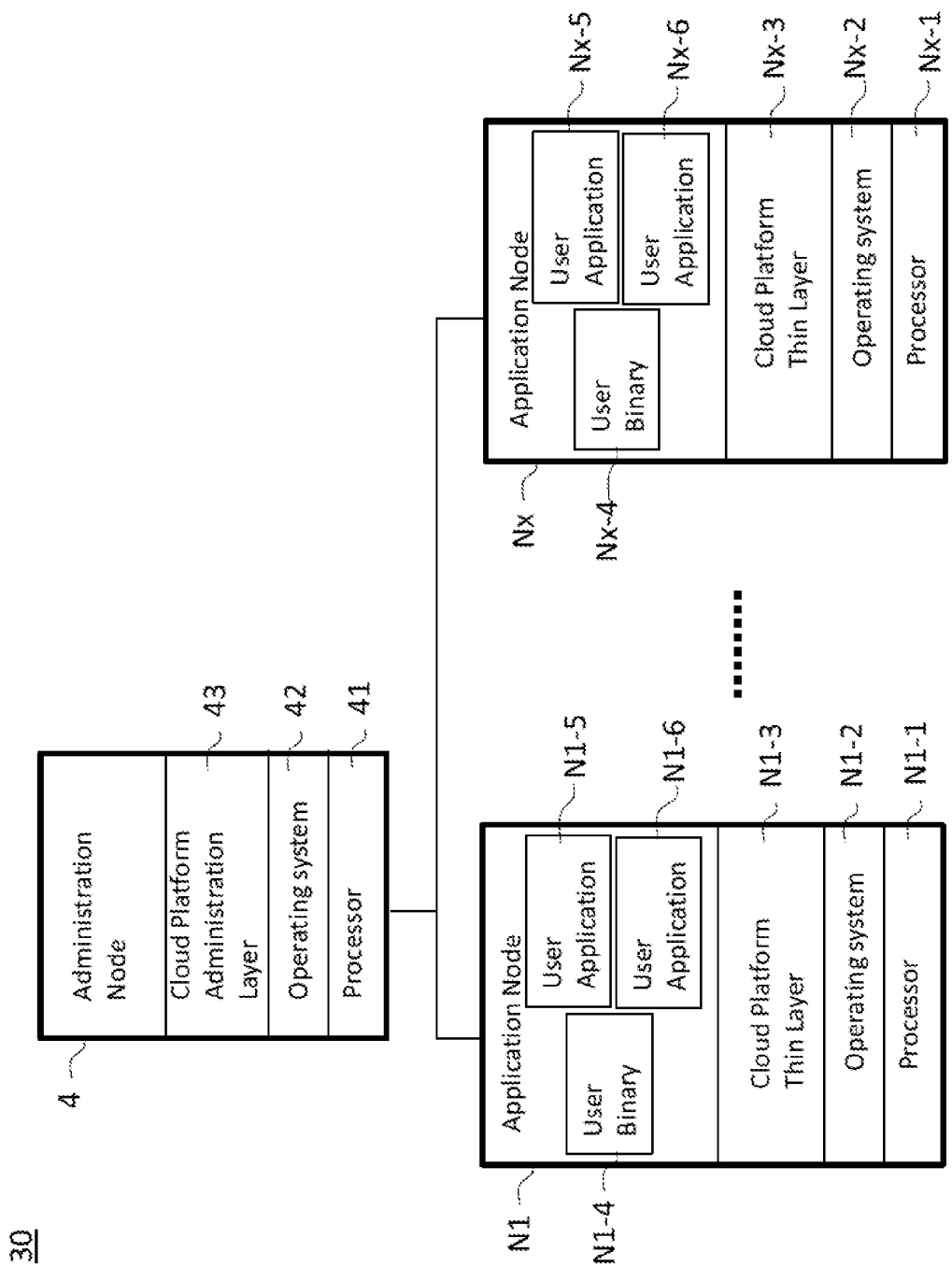
FIG. 3 illustrates a cloud computing infrastructure according to the present invention.

FIG. 3 illustrates a cloud computing infrastructure according to the present invention. The cloud computing infrastructure 30 proposed in the present disclosure includes at least one administration node 4 and a plurality of application nodes (N1, . . . , Nx). The plurality of application nodes (N1, . . . , Nx) and the administration node 4 are connected with each other logically via a local area network, via Internet or via high speed bus links. In order to balance the load of the administration node 4, there may be more than one administration node configured to be operative in the cloud computing infrastructure 30.

Figure 4:
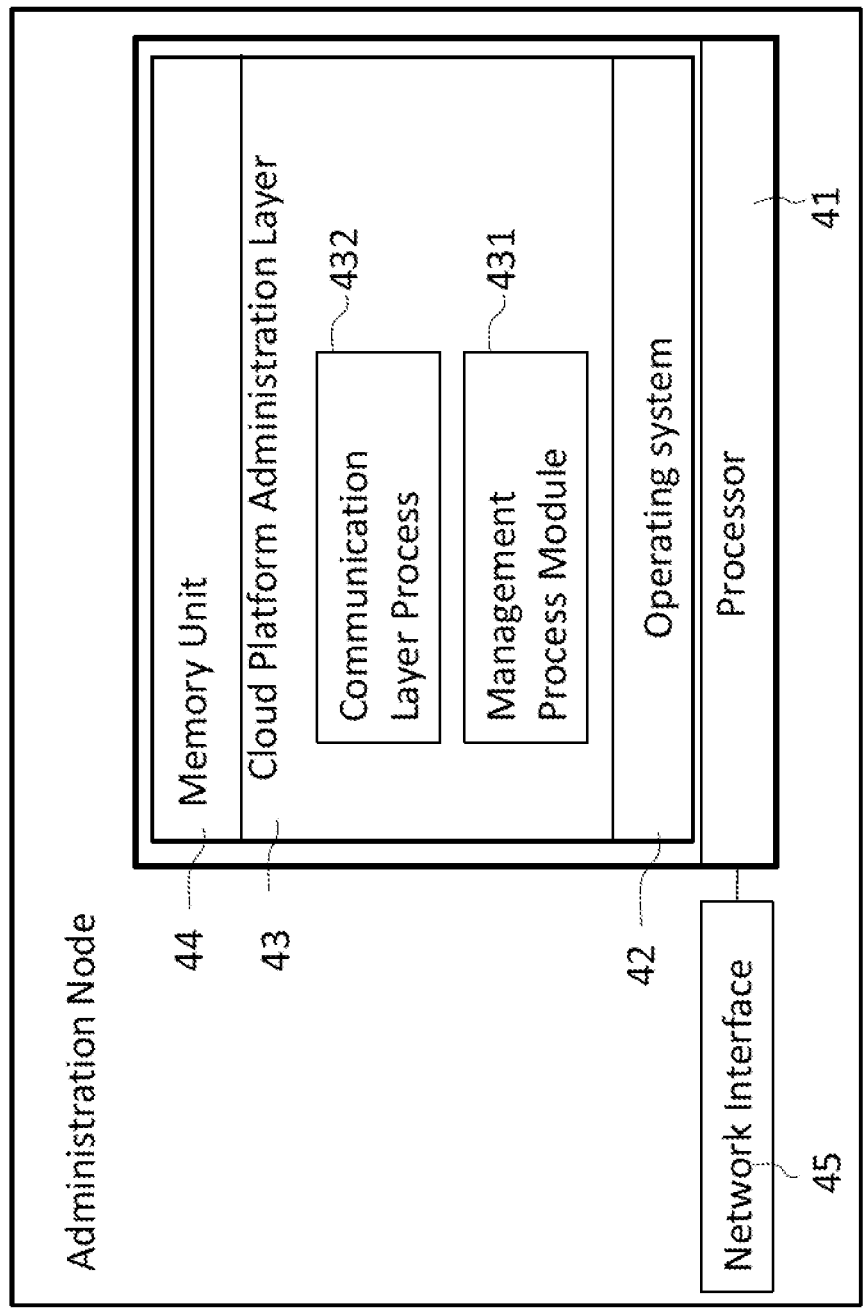
FIG. 4 describes functional elements of an administration node according to the present invention.

FIG. 4 illustrates the functional elements of the administration node 4 according to an exemplary embodiment of the present invention. Referring to FIG. 4, the administration node 4 includes a processor 41, a memory unit 44, an operating system 42 and a memory unit 44. Further, the operating system 42 is running on the processor 41 in the memory unit 44. A cloud platform administration layer 43 is also provided, which runs on top of the operating system 42. The cloud platform administration layer 43 includes a communication layer process (CLP) entity 432, which is configured to enable communication of the administration node 4 with other application nodes (N1, . . . , Nx) and other administration node 4 (if any) in the cloud computing infrastructure 30. Further, the cloud platform administration layer 43 is also configured to adapt at least a management process module 431 to manage or monitor other application nodes (N1, . . . , Nx) in the cloud computing infrastructure 30. Additionally, the administration node 4 also includes a network interface 45 which communicates to the CLP entity 432.

The management process module 431 is provided with a configuration database for storing, updating and maintaining all configuration information of each process in each service and configuration information of each service in the cloud computing infrastructure 30. The said configuration database can be in form of software instances or software entities respectively responsible for managing clusters of processes, logging events, raising alarms, monitoring essential process of each application node, storing and updating static configuration of each application node in the cloud computing infrastructure 30. For example, the management process module 431 may include an operation-administration-monitoring process (OAMP) entity responsible for storing, updating and maintaining all configuration information of each process in each service and configuration information of each service in the cloud computing infrastructure 30. Also, the management process module 431 includes other software entities respectively responsible for receiving input commands from users regarding storing, managing and updating configurations of "Groups", configurations of "Clusters" under each "Group", configurations of "Services" under each "Cluster"; and finally configurations of "Processes" under each "Service". The CLP entity 432 is configured to provide communication functionalities for other processes in the administration node 4 to communicate with application nodes (N1, . . . , Nx). For instance, the CLP entity 432 includes routing tables related to application nodes (N1, . . . , Nx), forward domain name resolution mapping tables of application nodes (N1, . . . , Nx), and networking protocol stack software.

Figure 5:
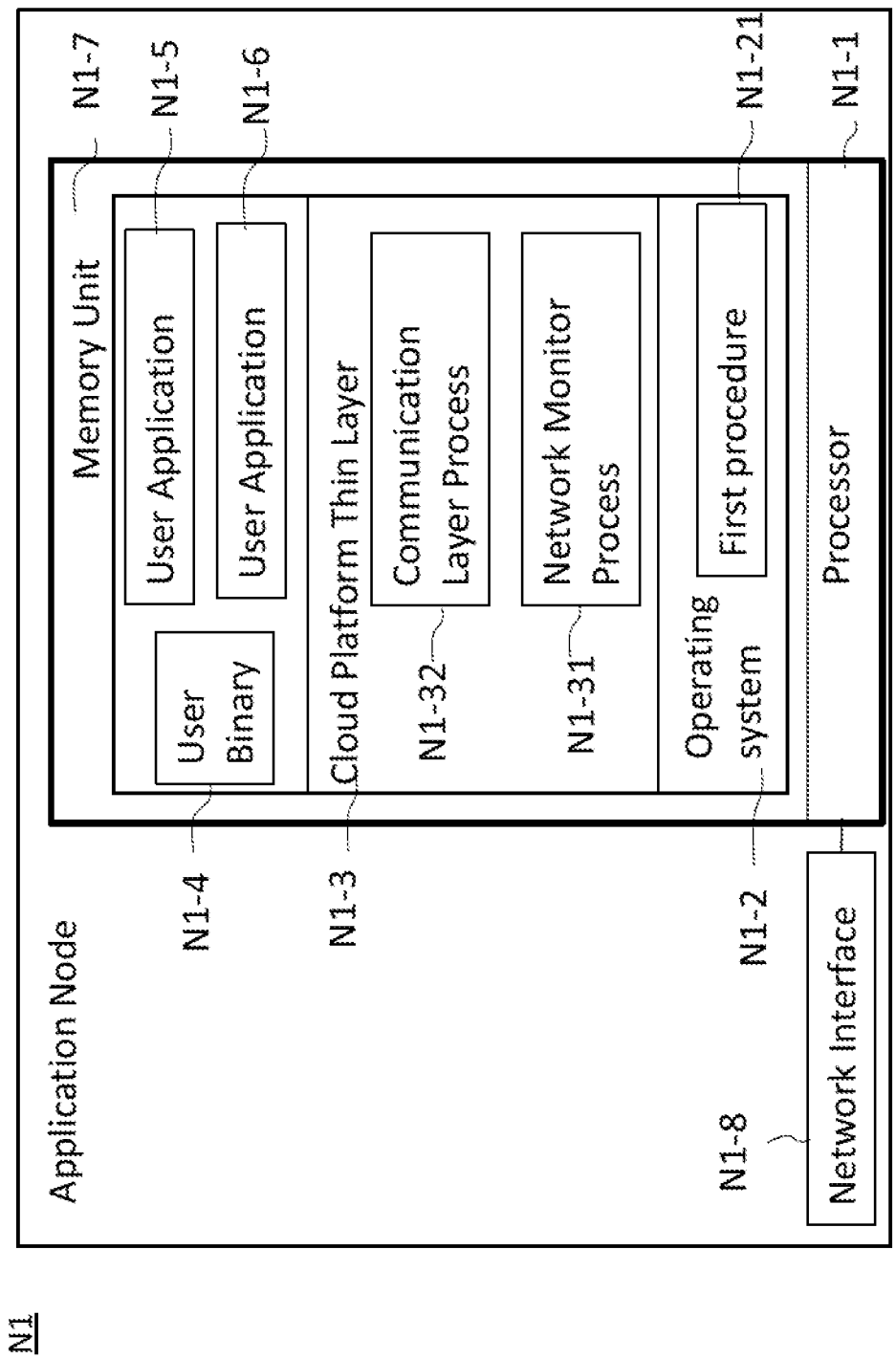
FIG. 5 is a schematic diagram illustrating functional elements of an application node according to an embodiment of the present invention.

FIG. 5 is a schematic diagram illustrating functional elements of the application node N1 according to an exemplary embodiment of the present invention. Referring to FIG. 5, the application node N1 is configured to adapt a processor N1-1, an operating system N1-2 running on the processor N1-1 in a memory unit N1-7, and a cloud platform thin layer N1-3 running on top of the operating system N1-2. Also, there is provided a user binary N1-4 or user applications (N1-5, N1-6) running on top of the cloud platform thin layer N1-3. In the present disclosure, the user binary or the user application running in an application node is the process of a service in the cloud computing infrastructure 30. The other application nodes have similar functional elements as disclosed above in respect of the application node N1.

Further, the cloud platform thin layer N1-3 includes a NMP entity N1-31 responsible for monitoring and managing processes and a CLP entity N1-32 responsible for communications with other application node and administration node in the cloud computing infrastructure 30. The NMP entity N1-31 includes software instance or software entities respectively responsible for managing and monitoring processes running on top of the cloud platform thin layer N1-3. The user binary N1-4 may be software provided by the third party software provider; and the user application is software which can be configured in each application node. Additionally, the application node N1 includes a network interface N1-8 which communicates to the CLP entity N1-32.

The CLP entity N1-32 is configured to provide communication functionalities for other processes in the application node N1 to communicate with administration node 4 and other application nodes (N1, . . . , Nx). For instance, the CLP entity N1-32 may include routing tables related to the administration node 4 and the application nodes (N1, . . . , Nx), forward domain name resolution mapping tables associated to the administration node 4 and the application nodes N2, . . . , Nx, and networking protocol stack software. The management process module 431 of the administration node 4 monitors the NMP entity N1-31 in each application node present in the cloud computing infrastructure 30.

Figure 6:
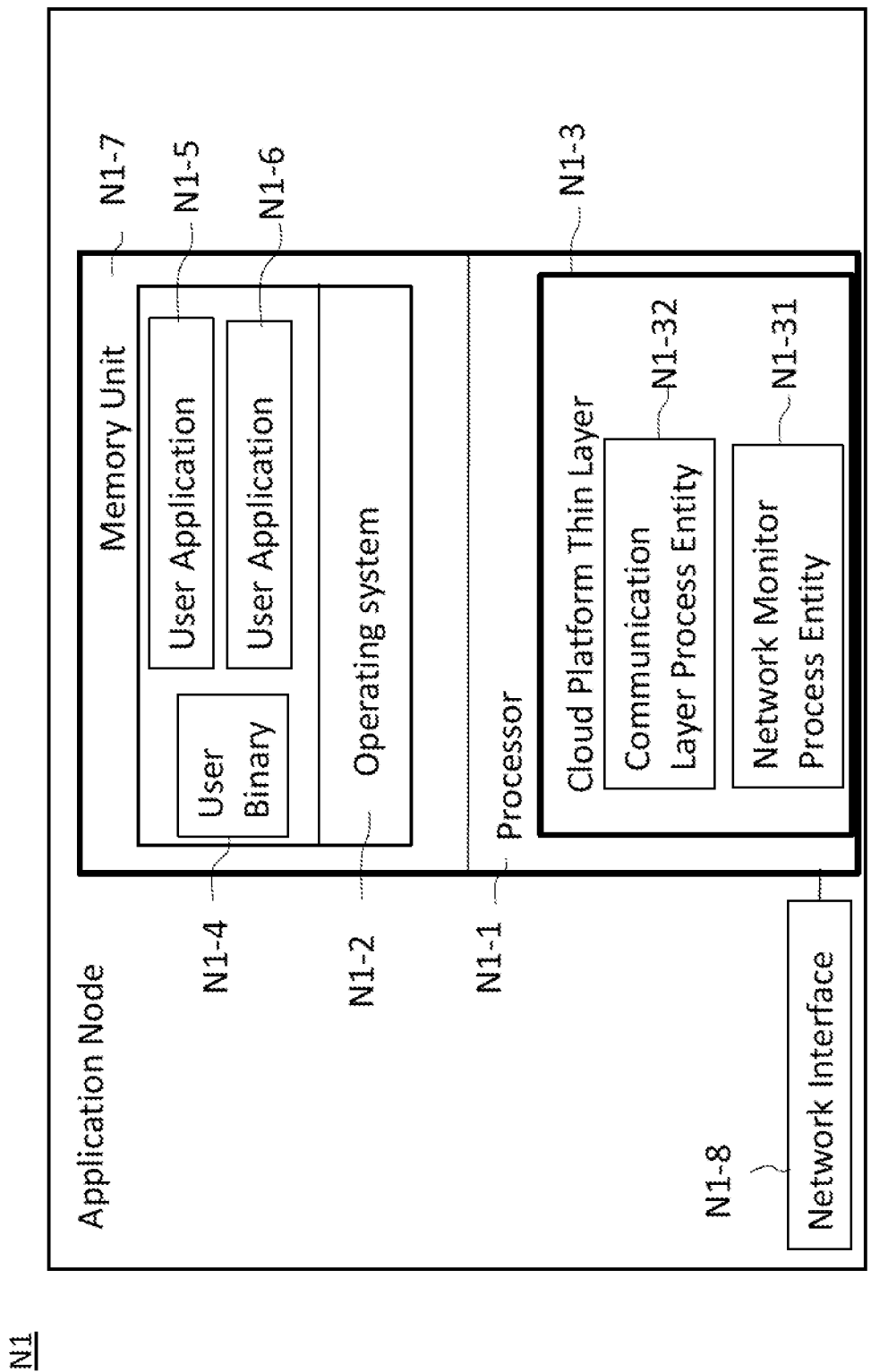
FIG. 6 illustrates the functional elements of an application node according to an alternate embodiment of the present invention.

FIG. 6 illustrates the functional elements of an application node according to an alternative embodiment of the present invention. Referring to FIG. 6, the application node N1 is configured to adapt a processor N1-1, an operating system N1-2 running on the processor N1-1 in a memory unit N1-7, and a cloud platform thin layer N1-3 running in the processor N1-1. Also, there is provided a user binary N1-4 or user applications (N1-5, N1-6) running on top of the operating system N1-2. In the present disclosure, the user binary or the user application running in an application node is the process of a service in the cloud computing infrastructure 30. The other application nodes may have similar functional elements as disclosed above in respect of the application node N1. Further, the cloud platform thin layer N1-3 includes a NMP entity N1-31 responsible for monitoring and managing processes and a CLP entity N1-32 responsible for communications with other application node and administration node in the cloud computing infrastructure 30. The NMP entity N1-31 may be dedicated electronic circuit responsible for managing and monitoring processes running on top of the cloud platform thin layer N1-3. The user binary N1-4 may be software provided by the third party software provider; and the user application is software which can be configured in each application node. Additionally, the application node N1 may include a network interface N1-8 which communicates to the CLP entity N1-32.

The CLP entity N1-32 may be a dedicated electronic circuit configured to provide communication functionalities for other processes in the application node N1 to communicate with administration node 4 and other application nodes (N2, ..., Nx). For instance, the CLP entity N1-32 may include routing tables related to the administration node 4 and the application nodes N2, ..., Nx, forward domain name resolution mapping tables associated to the administration node 4 and the application nodes N2, ..., Nx, and networking protocol stack software. The management process module 431 of the administration node 4 monitors the NMP entity N1-31 in each application node present in the cloud computing infrastructure 30.

According to the preferred embodiment of the present invention there is provided a system to manage a process or set of processes in a cloud computing infrastructure 30. The system may include at least one administration node 4 and a plurality of application nodes (N1, ..., Nx). The application nodes (N1, ..., Nx) are connected to the at least one administration node 4 through some network connections. Each application node receives configuration instruction from the administration node 4, to run a process or set of processes on itself. Upon receipt of configuration information from the administration node 4, each application node fetches from the configuration database configuration data of processes which is to be initiated, and the configuration database may be stored in the management process module 431 of the administration node 4. A NMP entity N1-31 in each of the application node (N1, ..., Nx) is the first process to be created and initiated in that application node. Once initiated, the NMP entity N1-31 in each application node, initiates at least one process other than itself through a first procedure. According to the present disclosure the first procedure is an "UPSTART procedure" N1-21 of the operating system N1-2. The first procedure is an asynchronous event-based procedure configured to initiate at least one process during a system boot, stop at least one initiated process during a system shutdown, and monitor the at least one initiated process while the application node, on which the first process is initiated, is still running. After initiation of processes by the NMP entity N1-31 on its application node N1, the NMP entity N1-31 monitors the operational status of the process or the set of processes initiated in the application node N1 other than itself through the first procedure. Further, the NMP entity N1-31 communicates the operational status of the processes running on its application node N1 to the management process module 431 of the administration node 4.

In case any user application or user binary (process) experiences failures, experiences load greater than a preconfigured working load threshold (e.g., 80% of processor usage or 80% of memory utilization for a pre-configured duration of 5 minutes), the NMP entity N1-31 in the same application node N1 firstly, report these events of failure or abnormal operational condition to the management process module 431 of the administration node 4. The management process module 431, after receiving the operational status of the processes running in the application node N1, in turn can instruct the NMP entity Nx-31 of other application nodes Nx to initiate/initialize a new process according to initialization configuration information of the new process stored in the configuration database in the management process module 431. The NMP entity Nx-31 of an application node Nx can also be instructed by the management process module 431 to initiate new process which will take place of the process experiencing events of failure or abnormal operational condition(s) on an application node different from the application node Nx.

According to the preferred embodiment of the present invention, there is also provided a method to manage a process or a set of processes in a cloud computing infrastructure 30. The method comprises initiating a first process at each application node N1, ..., Nx by the management process module 431 of the at least one administration node 4. The first process to be initiated on every application node (N1, ..., Nx) is a network monitoring process (NMP) entity (N1-31, ... Nx-31). Once initialized, the NMP entity (N1-31, ..., Nx-31) obtains the configuration information of all the processes to be initiated in the application nodes (N1, ..., Nx) from the configuration database stored in the network management module 431 of the administration node 4. Thereafter, initiating, a process or set of processes by the first process by the NMP entity of each application node (N1, ..., Nx) through a first procedure. According to the present disclosure the first procedure is an "UPSTART procedure" N1-21 of the operating system N1-2. Furthermore, monitoring, operational status of all the processes running on each application node (N1, ..., Nx) by their respective NMP entity (N1-31, ..., Nx-31), other than the first process through the first procedure. Communicating, the operational status of the processes running in the application nodes (N1, ..., Nx) by their respective NMP entity (N1-31, ..., Nx-31), to the management process module 431 of the administration node 4.

According to the preferred embodiment of the present invention, there is also provided a computing apparatus N1 which may include a networking interface, connected to at least one administration node 4 and at least one other computing apparatus N2-Nx in a cloud computing infrastructure 30. Further, there is provided a cloud platform thin layer entity N1-3, connected with the networking interface N1-8, and is configured to perform at least the following steps of: initiating a first process on the cloud computing infrastructure 30 by a management process module 431 of at least one administration node 4. The first process to be initiated on every application node (N1, ..., Nx) is a network monitoring process (NMP) entity (N1-31, ..., Nx-31). Once initialized, the NMP entity (N1-31, ..., Nx-31) obtains the configuration information of all the processes to be initiated in the application nodes (N1, ..., Nx) from the configuration database stored in the network management module 431 of the administration node 4. Thereafter, initiating, a process or set of processes by the first process by the NMP entity of each application node (N1, ..., Nx) through a first procedure. According to the present disclosure the first procedure is an "UPSTART procedure" N1-21 of the operating system N1-2. Furthermore, monitoring, operational status of all the processes running on each application node (N1, ..., Nx) by their respective NMP entity (N1-31, ..., Nx-31), other than the first process through the first procedure. Communicating, the operational status of the processes running in the application nodes (N1, ..., Nx) by their respective NMP entity (N1-31, ..., Nx-31), to the management process module 431 of the administration node 4.

Figure 7:
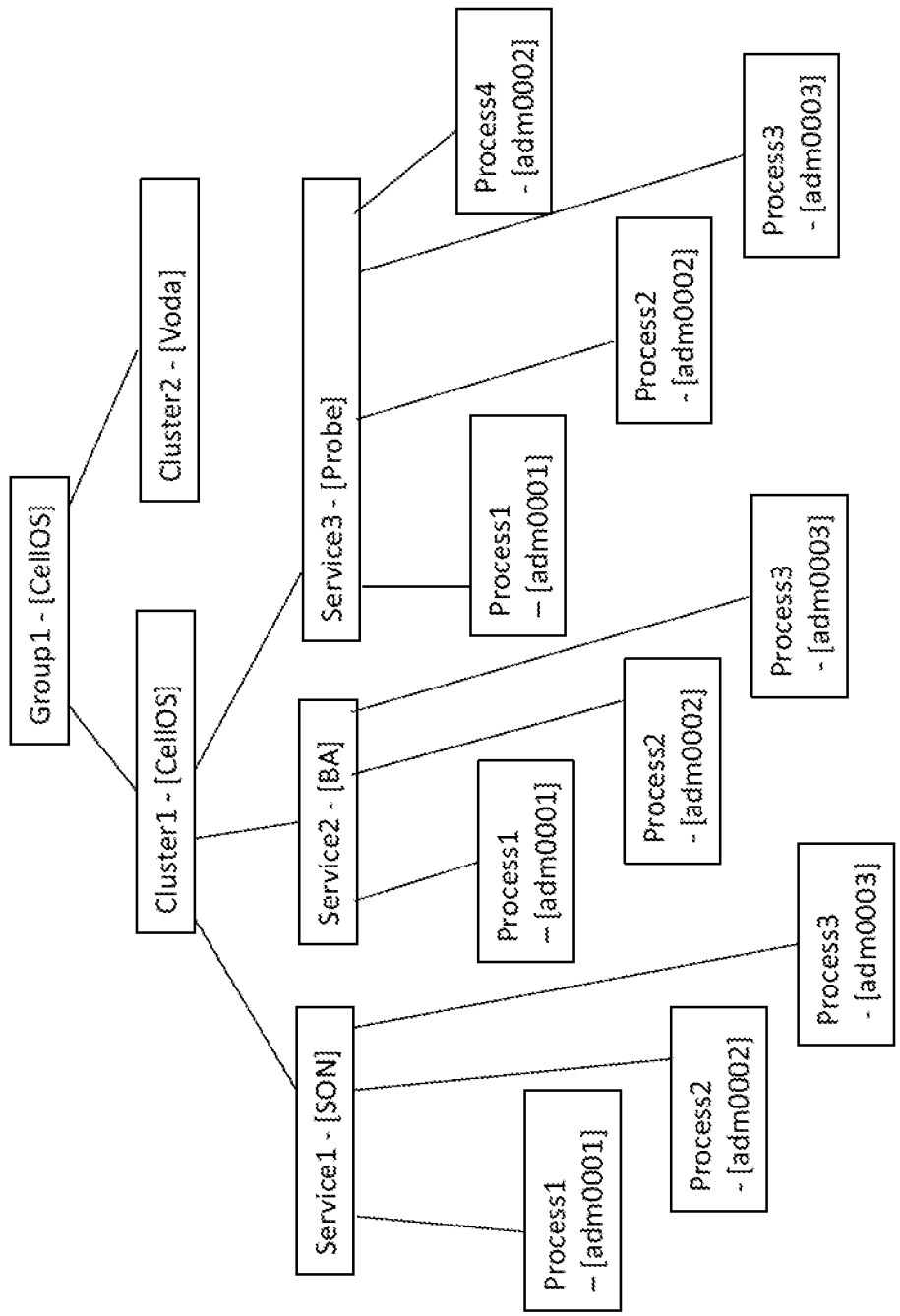
FIG. 7 is a schematic diagram illustrating an exemplary hierarchical structure of processes of services in a cloud computing infrastructure.

FIG. 7 is a schematic diagram illustrating an exemplary hierarchical structure of processes of services in a cloud computing infrastructure. For instance, each cluster under the Group1 (with a group name of "CellOS") belongs to a telecommunication service provider as a user in the cloud computing infrastructure 30. For the simplicity of illustration, there are only two clusters shown in FIG. 6 such as "Cluster1" (assigned with a cluster name of "CellOS") and "Cluster2" (assigned with a cluster name of "Voda"). Also, the detailed elements in the hierarchical structure of "Cluster2" are not shown in FIG. 6, but the logical structure of "Cluster2" is similar to that of the "Cluster1".

Referring to FIG. 7, under the "Cluster1" (assigned with the cluster name of "CellOS"), there are currently three services such as "Service1", "Service2", "Service3" which respectively have their service names of "SON", "BA" and "Probe". Here "SON", "BA" and "Probe" represent different business services that the user "CellOS" subscribes to. The second user such as "Voda" may subscribe to different sets of services from those subscribed by the first user "CellOS".

At the instance shown in FIG. 7, there are 3 processes currently belonging to "Service1" such as "Process1", "Process2", "Process3" which respectively are named with "adm0001", "adm0002" and "adm0003" in the cloud computing infrastructure 30. Similarly, there are 3 processes currently belonging to "Service2" such as "Process1", "Process2", "Process3" which respectively are named with "adm0001", "adm0002" and "adm0003". Likewise, there are 4 processes belonging to "Service2" such as "Process1", "Process2", "Process3" and "Process4" which respectively are named with "adm0001", "adm0002", "adm0003" and "adm0004".

It should be noted that not all process objects belonging to the same service object are running in the same application node N1. For example, "Process1", "Process2", "Process3" belonging to "Service2" may be running on different application nodes (N1, . . . , Nx). In some cases, the process objects belonging to the same service object may running on different application nodes (N1, . . . , Nx) at different geographic locations for load balancing. Also, all process objects and even service objects are assigned with Internet addresses and port numbers. Here, every process object is an instance of service to which it belongs.

Figure 8:
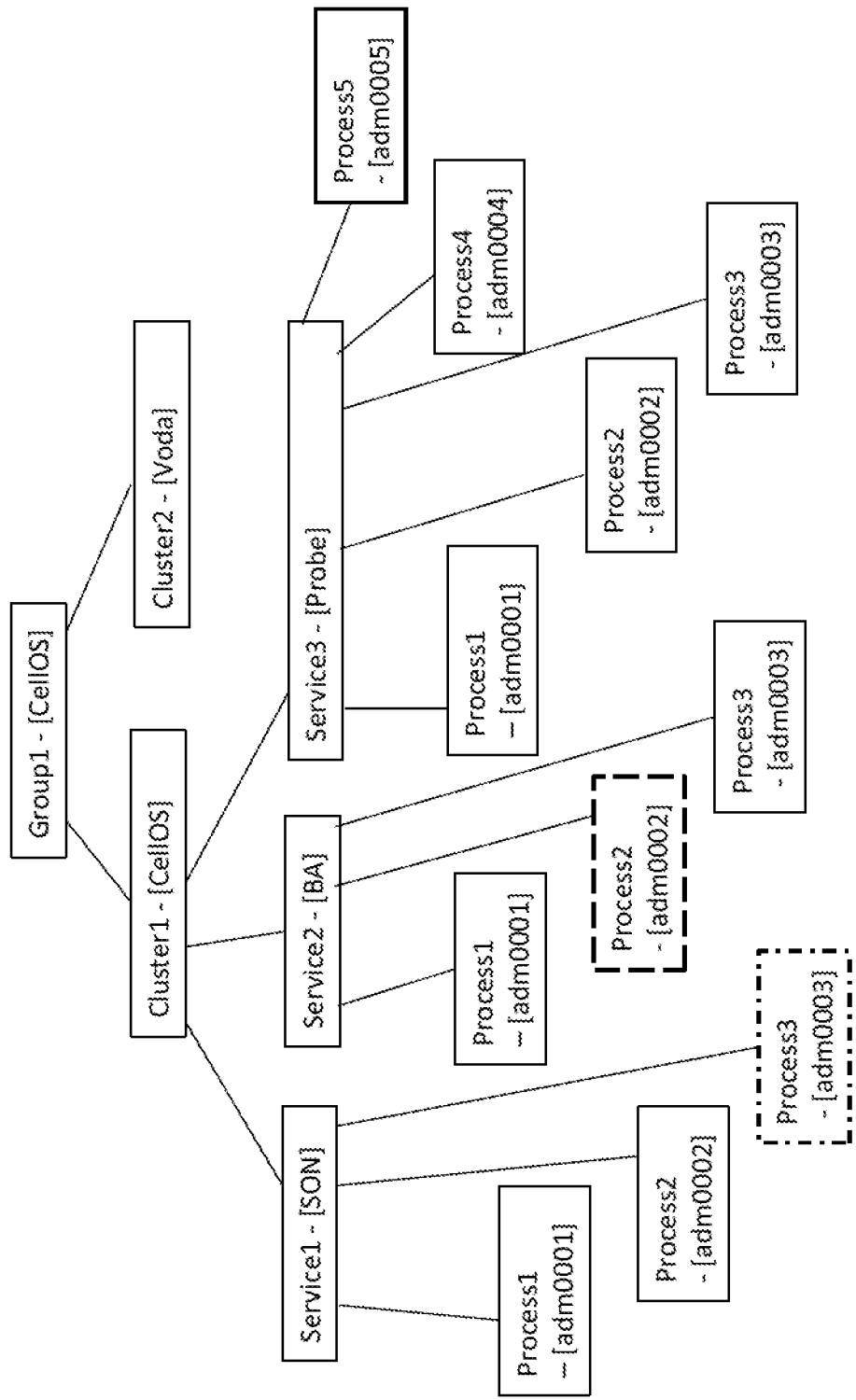
FIG. 8 illustrates a change in the exemplary hierarchical structure of services and processes in a cloud infrastructure.

FIG. 8 is a schematic diagram illustrating a change in the exemplary hierarchical structure of services and processes in a cloud infrastructure. The change is made with respect to a previous state shown in FIG. 7. Referring to FIG. 7, for instance, due to lower working load on the "Service1" from the user, the "Process3" (illustrated with dashed line) is shut down by the NMP entity N1-31 of the application node N1 which previously runs the "Process3" of the "Service1". In this example, the NMP entity N1-31 may firstly detect operational status of the "Process3" at low utilization rate, reports such low utilization status information to the management process module 431 of the administration node 4, and may be subsequently instructed by the management process module 431 to shut down the "Process3" under "Service1", for example via a shutdown command transmitted from the management process module 431 to the NMP entity N1-31.

In another illustration, due to sudden increase on working load of the "Service3", a NMP entity of an application node may be instructed by the management process module 431 to initiate the "Process5" under "Service3". In another case, due to low working loads of the application node Nx, "Process2" under "Service2" may be migrated by the NMP entity Nx-31 of the application node Nx to another application node. In any case illustrated previously, the IP address, the port number and the operational status of the changed "Process3" under "Service1", "Process2" under "Service2" and "Process5" under "Service3" may be delivered on-time to their belonging service objects as well as all processes which are interested in any change of these processes.

Referring to FIG. 8, when the "Service1" is firstly initiated, the first process "Process1" belonging to "Service1" is initiated by the NMP entity N1-31 of the application node N1 according to instructions and initialization configuration information from the management process module 431 of the administration node 4. From the perspective of the application node N-1, the NMP entity N1-31 is the first process in the application node N-1. If the NMP entity N1-31 directly creates or initiates the "Process1", then the "Process1" is the child process of the NMP entity N1-31. However, in the present invention, the NMP entity N1-31, initiates any other process via first procedure N1-21 of the operating system N1-2 only indirectly. Also, the NMP entity N1-31 reports the process name of the process, which is just initiated, to the management process module 431 of the administration node 4. The management process module 431 maintains records of mapping relationship of the process name and platform process ID for each process. It should be noted that the first procedure N1-21 i.e. "UPSTART procedure" is performed by an "initialization daemon" (not shown) of the operating system N1-2.

In the present invention, the NMP entity N1-31 does not need to record UNIX process ID for any other process initiated via the first procedure N1-21. In other words, the NMP entity N1-31 no longer maintains any "parent-child" relationship in its operation. Neither does the NMP entity N1-31 maintain any inline table containing the "parent-child" relationship between each process name and its corresponding UNIX process ID/local process ID in the application node N1. When the NMP entity N1-31 accidently goes down, the management process module 431 of the administration node 4 can detect the operation status of the NMP entity N1-31 being "DOWN". In response to such incident, the management process module 431 will restart the NMP entity N1-31. After the NMP entity N1-31 is restarted, the NMP entity N1-31 only needs to acquire configuration information for any process other than itself running in the application node N1. Here, the NMP entity N1-31 also acquires the process name for any process other than itself running in the application node N1 according to the configuration information. By the process name of processes indirectly initiated previously by the NMP entity N1-31, the NMP entity N1-31 can easily monitor the operational status of any other process in the application node N1 via the first procedure N1-21.

Similarly, when the "Process3" is firstly initiated by another application node Nx for the same "Service1", the management process module 431 provides the NMP entity Nx-31 with instructions and initialization configuration information of "Process3". Here, the NMP entity Nx-31 is the first process to be initiated in the application node Nx, and the NMP entity Nx-31 will be responsible for initiating other process such as the "Process3" belonging to "Service1" in the application node Nx.

In the cloud computing infrastructure 30, an administration node 4 always goes up firstly, and then one or more application nodes (e.g., application nodes N1, . . . , Nx) gradually starts up. In the administration node 4, the management process module 431 includes an OAMP entity which maintains an initialization configuration database in the management process module 431. In the initialization configuration database, it contains the configuration information about which process should be initiated by which application node (N1, . . . , Nx) and the process's related configuration information after the process is initiated. The related configuration information is updated by the NMP entity of the application node on which the process is currently running.

According to the present invention, there are two situations in which the NMP entity N1-31 is initiated in the application node N1. The first case is when the application node N1 is just powered on; and the second case is when the NMP entity N1-31 of the application node N1 goes down accidentally and then goes up again by the initiation process performed by the management process module 431 of administration node 4.

When an application node N1 starts up, the process which is initiated first in the application node N1 is the NMP entity N1-31. Then, the NMP entity N1-31 obtains the configuration information from the configuration database (e.g., a database in the management process module 431 of the administration node 4), and configures a process list which it will maintain in its application node N1 according to the configuration information obtained from the configuration database. Thereafter, the NMP entity will issue configuration command or configuration instruction to an first procedure N1-21 of the operating system N1-2 to initiate any other process(es) apart from itself (i.e., the first process in the application node N1) according to the process list and obtained configuration information for each process to be initiated on the same application node N1. The NMP N1-31 entity also acquires UNIX process ID of each process initiated in the application node N1 from the "initialization daemon" (abbreviated as an init daemon thereinafter) of the operating system N1-2.

The first procedure N1-21 i.e. the "UPSTART procedure" is implemented via an "init daemon" of the operating system N1-2. However, the "init daemon" still is capable of "System-V services" in the operating system. For the first procedure N1-21, for any other process configuration files such as (serviceA.conf, serviceB.conf, service.conf) will be stored by the "init daemon" under the directory of /etc/init/ in the memory unit N1-7. Under the aforementioned directory of /etc/init/, each configuration file corresponds to a process to be monitored such as its operational status of "start/stop" or "UP"/"DOWN". In other words, "start" means the process is still operating, and "stop" means the process goes down. Due to the locally stored configuration files by the "init daemon", whenever any process starts/stops, the NMP entity N1-31 will acquire its process ID (UNIX process ID) and its operational state (started/stopped) via the first procedure N1-21. By having each process' UNIX process ID, the NMP entity N1-31 can monitor/control all the processes in the application node N1.

As mentioned previously, the first procedure N1-21 is implemented via the "init daemon" of the operating system N1-2 in each application node N1, . . . , Nx. The first procedure N1-21 is responsible for starting a list of configured processes when the application node N1 boots up; and the first procedure N1-21 is also responsible for shutting down the processes when the application node N1 is shut down. Additionally, the NMP entity N1-31 of the same application node N1 may periodically or aperiodically query the first procedure N1-21 of the operating system N1-2 for the operational status of any other process previously initiated on the same application node N1. Here, the operational status of each child process is either "UP" or "DOWN".

For example, when the NMP entity N1-31 of the application node N1 knows that there is no child process running at the moment and it needs to start up child process(es) according to the configuration information and configured list of processes from the management process module 431 of administration node 4, the NMP entity N1-31 does not need to query the first procedure N1-21 of the operating system N1-2 to determine if any child process is running in the application node N1.

The NMP entity N1-31 generates the configured process list according to the configuration information of any other process need to be running in the same application node N1. Then, the NMP entity N1-31 initiates any process in the application node N1 according to the processes configuration information and/or the configured process list. When the NMP entity N1-31 had initiated any process in the application node N1, the NMP entity N1-31 will request the first procedure N1-21 of the operating system N1-2 to report the operational status of all processes in the configured process list. In response, if the first procedure N1-21 provides the operational status of any process in the configured process list not running (or in down status), then the NMP entity N1-31 restarts that process via the first procedure N1-21 of the operating system N1-2.

In the present invention, the process is a user application binary or user binary running in each application node (N1, . . . , Nx), and the first process initiated in any application node (N1, . . . , Nx) is the NMP entity (N1-31, . . . , Nx-31). However, in the present invention, the NMP entity (N1-31 . . . Nx-31) no longer directly stores the UNIX process ID of the child processes, and the NMP entity (N1-31, . . . , Nx-31) indirectly monitors all other process in the application node (N1, . . . , Nx) on which its initiated through the "first procedure N1-21 of the operating system N1-2.

The management process module 431 of administration node 4 includes an OAMP entity (not shown) configured to maintain at least the process name(s) and corresponding platform process ID of all processes in a database. Also, the OAMP entity is responsible for maintaining information in the database about which application node (N1, . . . , Nx) should run which process. The process name and Platform Process ID of each process are stored and updated by the OAMP entity in the database of the management process module 431.

In the present invention, the platform process ID is a unique identifier within the name space in the cloud computing infrastructure 30. The platform process ID is used by the NMP entity (N1-31, . . . , Nx-31) of any application node (N1, . . . , Nx) to distinguish the same processes being initiated on the same application node for different users at the same time. For example, the platform process ID may be a binary identifier. The management process module 431 then store in its database the platform process ID and corresponding process name for each process of the cloud computing infrastructure 30.

On the other hand, the UNIX process ID of the child process will be stored by an "init daemon" along with the process name. The "init daemon" is the initialization daemon process in the operating system, and the "init daemon" keeps running until the application node N1 is shutdown. The "init daemon" may be responsible for starting system processes in the operating system N1-2 of the application node N1.

In an exemplary implementation case, the configuration file (or conf file) of each process in each application node (N1, . . . , Nx) is stored, for example, under the directory of "/etc/init/" of the application nodes (N1, . . . , Nx). In this example, the configuration files for three child processes may be: ServiceB1.conf, ServiceB2.conf, and ServiceB3.conf. Also, the complete process name may be

[Platform process ID]_process name. For example, the process name may be: "10001_alarmclient.conf" or "10002_alarmclient.conf".

In another example, in each application node, the "init daemon" may maintain an exemplary table containing the mapping of the UNIX process ID and the process name of each child process in the application node as shown in Table I.

TABLE I

Exemplary Table of Child Process'
Process Name and UNIX Process ID

| Process Name | UNIX Process ID | Directory of Child Process in "init daemon" |
|---|---|---|
| Alarmclient1 | 2343 | /etc/init/10001_alarmclient.conf |
| SONclient2 | 2344 | /etc/init/13002_sonclient.conf |
| Timerclient3 | 2351 | /etc/init/11003_timerclient.conf |
| Probeclient5 | 2399 | /etainit/12005_probeclient.conf |

Figure 9:
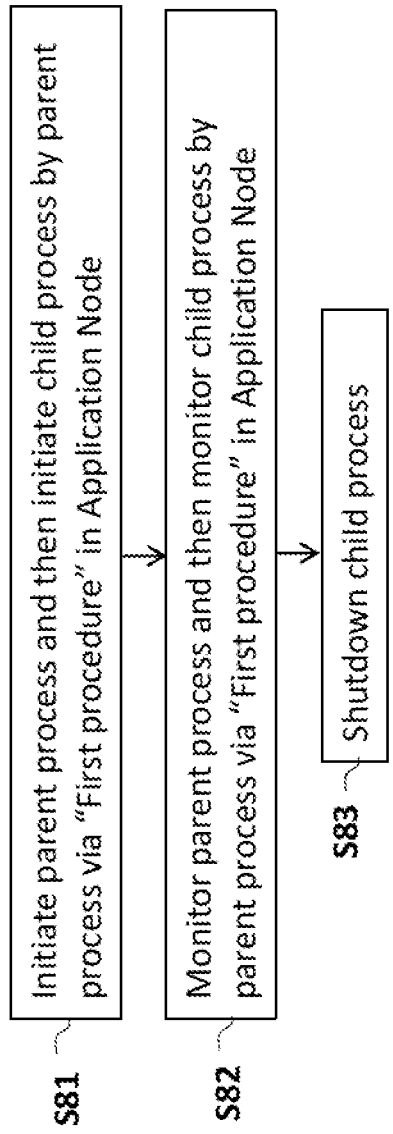
FIG. 9 depicts a flowchart illustrating a method of managing processes in cloud computing infrastructure/virtualized cloud platform according to an exemplary embodiment of the present invention.

FIG. 9 is a flowchart illustrating a method of managing processes in a cloud computing infrastructure/virtualized cloud platform according to an exemplary embodiment.

Referring to FIG. 9, at step S81, the management process module 431 of the administration node 4 firstly initiates a first process on an application node N1, and initiates one or more other process by the first process via the first procedure N1-21 of an operating system in the application node N1-2. Here, the first process initiated by the management process module 431 in the application node N1 will be the NMP entity N1-31.

For example, the management process module 431 includes a configuration database containing configuration information of all processes in the cloud computing infrastructure 30. The administration node 4 is communicatively connected to a plurality of application nodes (N1-Nx). When the administration node 4 intends to run any process of any service for a user in the application node N1, the management process module 431 has to determine whether the NMP entity N1-31 is running as the first process in the application node N1. If the NMP entity N1-31 has not been initiated, then the management process module 431 will first initiate the NMP entity N1-31 as the first process in the application node N1. After the NMP entity N1-31 is running in the application node N1, the management process module 431 will further initiate one or more child process(es) in the application node N1 via the first procedure N1-21 of the operating system N1-2 in the application node N1. The process other than the first process in this case may be, for example, the user binary N1-4 or user applications N1-5, N1-6, and the child processes running on the same application node N1 may belong to different service or different cluster in the cloud computing infrastructure 30.

The management process module 431 initially store the initialization configuration information of all processes in the cloud computing infrastructure 30 in a configuration database of the management process module 431. When the management process module 431 needs to configure the NMP entity N1-31 to initiate any process in the application nodes N1, the management process module 431 provides configuration information of one or more process other than the first process to the NMP entity N1-31 of the application nodes N1. Next, the NMP entity N1-31 initiates respectively the other processes according to their respective configuration information of via the first procedure N1-21 of the application nodes N1.

When the NMP entity N1-31 intends to initiate respectively the other processes according to their respective configuration information of via the first procedure N1-21, the NMP entity N1-31 configures the first procedure N1-21 to respectively initiate the at least one process, and then configure an "init daemon" of the operating system N1-2 to obtain a local process identifier for each successfully initiated process in the application node N-1. In the meantime, the NMP entity N1-31 also obtains the process name of each successfully initiated process from the first procedure N1-21. Finally, the NMP entity N1-31 configures the "init daemon" in the operating system N1-2 to store the process name and the local process identifier for each successfully initiated process in a local mapping table or a memory allocation. In this example, the local process identifier can be UNIX process ID for the initiated process.

After each process is initiated by the NMP entity N1-31 successfully, the NMP entity N1-31 reports to the management process module 431 the operational status of each child process along with the platform process ID and child process name. The management process module 431 accordingly updates all the reported information in the configuration database (of the management process module 431) the configuration information for each child process initiated in the application nodes N1.

At step S82, the management process module 431 of the administration node 4, continues to monitor the first process (i.e., the NMP entity N1-31) of the application node N1, and configure or request the first process to monitor any other process in the application node N1 via the first procedure N1-21 of the operating system N1-2 of the same application node N1.

For example, the management process module 431 monitor the operational status of the NMP entity N1-31 as the first process in application node N1, and request the NMP entity N1-31 to monitor respectively other processes (e.g., user binary N1-4, user applications N1-5, N1-6) via the first procedure N1-21 in the application node N1.

Then, the NMP entity N1-31 reports the operational status of other processes to the management process module 431 when the process is successfully initiated. Also, the NMP entity N1-31 continues to monitor all other processes in the application node N1 respectively via the first procedure N1-21. The monitoring and reporting can be periodic or aperiodic.

At step S83, the management process module 431 of the administration node 4, instructs the NMP entity N1-31 of the application node N1 to shut down a process running in the application node N1.

For example, when the working load of the service to which the user application N1-6 belongs to is less than a preconfigured workload threshold, the management process module 431 will determine to shut down the process via sending a shutdown command to the NMP entity N1-31 in the application node N1. Accordingly, after receiving the shutdown command, the NMP entity N1-31 will shut down the determined process via the first procedure N1-21 of the operating system N1-2 in the application node N1.

Figure 10:
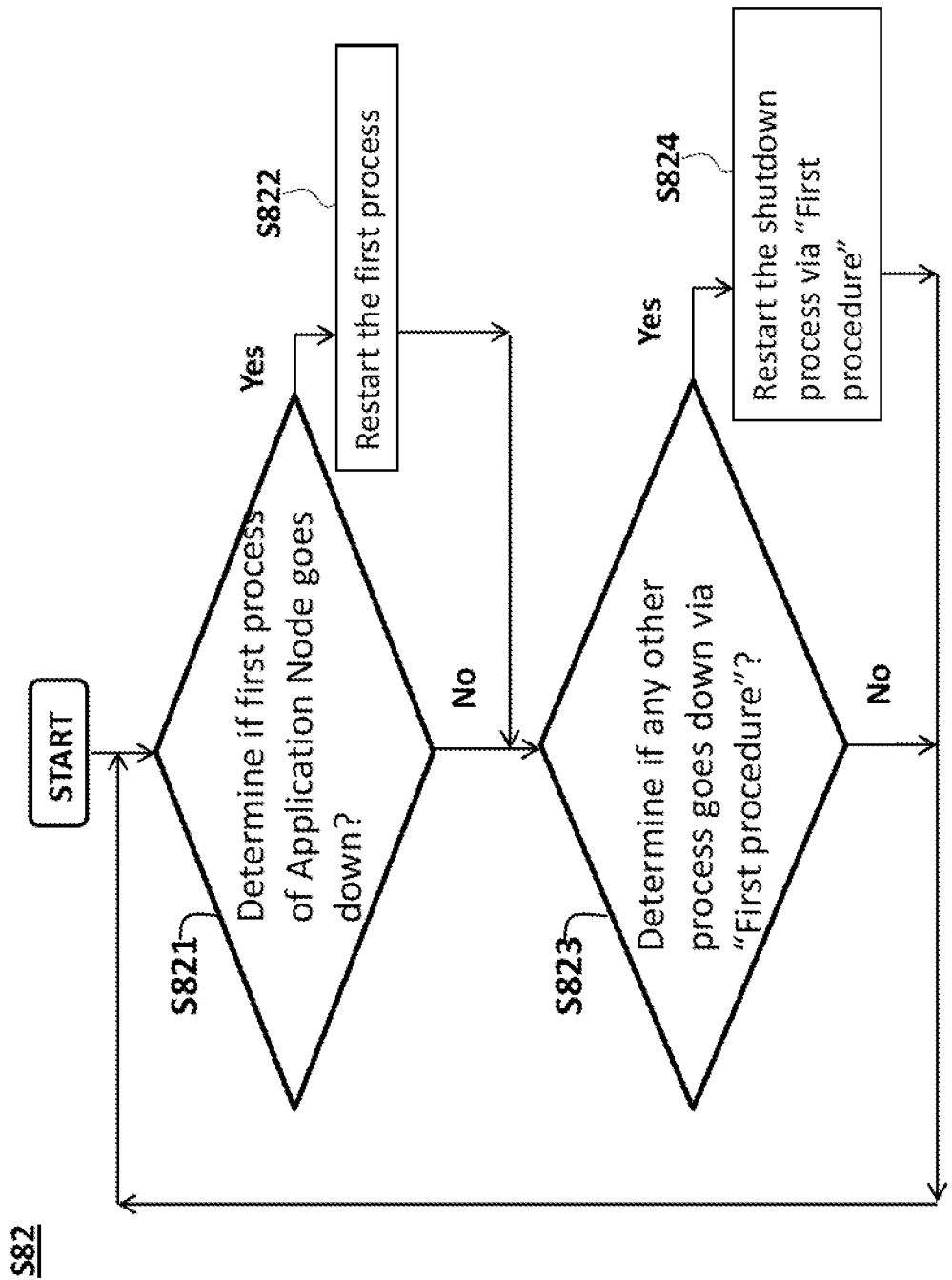
FIG. 10 depicts a flowchart illustrating a method of monitoring process in an application node in cloud computing infrastructure according to an exemplary embodiment of the present invention.

FIG. 10 is a flowchart illustrating a method of monitoring process in an application node in cloud computing infrastructure according to an exemplary embodiment. The step S82 shown in FIG. 9 can be described in more detail according to the procedures shown in FIG. 10.

At step S821, the management process module 431 of the administration node 4 will determine that whether the first process N1-31 of the application node N1 has gone down or not. When it is determined that the first process of the application node N1 is down, the management process module 431 will then restart the first process N1-31 in the application node N1 and further configures the first process N1-31 to monitor any other process on the same application node N1 in step S822. When it is determined that the first process has not gone down, step S823 is executed after the step S821.

At step S823, when the first process N1-31 is restarted, the first process (i.e., the NMP entity N1-31) will determine if any other process goes down via the first procedure N1-21 of the operating system N1-2 of the application node N1.

For example, when the NMP entity N1-31 is successfully restarted by the management process module 431, the NMP entity N1-31 as the first process in the application node N1 will acquire the configuration information of all other processes previously initiated in the application node N1 from the management process module 431. Then, the NMP entity N1-31 will also acquire the process name of all processes from the configuration information of the processes, and then request the first procedure N1-21 to respectively report the operational status of all these processes according to the acquired process names. According to the operational status reported by the first procedure N1-21, the NMP entity N1-31 will determine if any process in the application node goes down.

When it is determined that any process apart from the first process N1-31 has gone down accidentally, the first process N1-31 will restart the child process which had shutdown via the first procedure N1-21 of the operating system in the same application node N1. The step S821 is executed normally after the steps S823 or S824.

By executing the methods of managing services in cloud computing infrastructure allocation shown in preceding exemplary embodiments, it will be more efficient and effective in initiating processes, monitoring processes and restarting the "shutdown" process in an application node even when the "first process" or any other process shutdown or goes down accidentally. The "NMP entity" as the first process in each application node no longer stores the local process ID but only the process name of each process. Meanwhile, the process name and the platform process ID will be maintained by the OAMP entity of the administration node in a database of the administration node. When the NMP entity of an application node goes down accidentally, the NMP entity can still trace back all local process ID corresponding to the processes currently running in the same application node, since the "init daemon" of the same application node stores the mapping of the process name and the local process ID for each process. Also, the configuration information of all processes in each application node will be maintained by the OAMP entity of the administration node, where the configuration information at least includes the platform process ID and the process name. These configuration files of the OAMP entity can be used by the NMP entity of any application node to determine which child process is running on the same application node. Additionally, the first procedure is implemented by the "init daemon" of the operating system of the application node, so the first process of any application node can easily initiate any child process, monitor the operational status of any child process and restart the shutdown process via the first procedure in the same application node.

The preceding exemplary embodiments of the present invention may be implemented in software/instruction codes/application logic/instruction set/computer program codes (executed by one or more processors), may be fully implemented in hardware, or implemented in a combination of software and hardware. For instance, the software (e.g., application logic, an instruction set) is maintained on any one of various conventional computer-readable media. In the present disclosure, a "computer-readable medium" may be any storage media or means that can carry, store, communicate, propagate or transport the instructions for use by or in connection with an instruction execution system, apparatus, or device, such as a computing device, a cloud computing infrastructure shown in FIG. 3. A computer-readable medium may include a computer-readable storage medium (e.g., a physical device) that may be any media or means that can carry or store the instructions for use by or in connection with a system, apparatus, or device, such as a computer or a communication device. For instance, the memory unit of the administration node or the application node may include the computer-readable medium which may contain computer program code, when executed by the processor unit, may cause the management process module and the CLP entity in the administration node, the CLP entity and the NMP entity in the application node to perform procedures/steps illustrated in FIGS. 8-9.

Embodiments of the system, method and computing apparatus of the present invention provide useful solutions to efficiently and effectively manage processes (which may belong to different service instances) in a cloud computing infrastructure and also enable on-time monitoring of any process in the cloud computing infrastructure.

The aforementioned embodiments have been described by way of examples only and modifications are possible within the scope of the claims that follow.

What is claimed is:

1. A system adapted to manage at least one process in cloud computing infrastructure, comprising: at least one administration node; and a plurality of application nodes, connected to at least one administration node, wherein the at least one administration node is configured to store a predefined mapping relationship of a plurality of processes and a process identifier associated with each of the plurality of processes, and wherein the plurality of processes are capable of being executed on the plurality of application nodes, wherein the at least one administration node is configured to initiate a first process on each of the plurality of application nodes, wherein the first process initiated is a network monitoring process entity (NMP), wherein the first process is configured to obtain configuration data from configuration database stored in the at least one administration node and create a process list to be initiated on any of the application node on which the first process is operating, and wherein the plurality of application nodes are configured upon instruction from one of the at least one administration node to run at least one process for at least one service, to perform the following: initiating, at least one process other than the first process on each of the plurality of application nodes by the first process through a first procedure implemented on each of the plurality of application nodes, wherein the first process on each of the plurality of application nodes determines the process information of all the processes initiated on any of the application node on which the first process is operating, and wherein the first procedure is an asynchronous event-based procedure configured to initiate at least one process during a system boot and stop the at least one process initiated during a system shutdown, and wherein each application node hosting the at least one process other than the first process is configured to store a predefined mapping relationship of the at least one process and a process identifier associated with the at least one process; monitoring, the process identifier and an operational status of the at least one process other than the first process, through the first procedure, by the first process in each of the plurality of application nodes, wherein the first procedure is configured to monitor the at least one process initiated while the system of the application node, on which the first process is initiated, is still running, wherein the monitoring the operational status includes monitoring either the at least one process experiencing an operating failure or the at least one process experiencing work load greater than a predefined threshold; and communicating, the operational status of the at least one process other than the first process to one of the at least one administration node, wherein the administration node instructs the first process of other application node to initiate a new process other than the first process on the other application node based on the operational status of the at least one process other than the first process of the application node.

2. The system as claimed in claim 1, wherein each of the plurality of application nodes are connected with at least one of other application nodes.

3. The system as claimed in claim 1, wherein the administration node comprises a management process module, and wherein the management process module comprises the configuration database storing configuration data of all the processes initiated in the cloud computing infrastructure.

4. The system as claimed in claim 1, wherein the network monitoring process entity continuously monitors the operational status of all the processes initiated on any of the application node on which the first process is operating.

5. The system as claimed in claim 4, wherein the network monitoring process entity of each of the plurality of application nodes communicates the operational status and process information to the at least one administration node.

6. The system as claimed in claim 5, wherein the at least one administration node communicates the operational status received to all the other application nodes.

7. A method adapted to manage at least one process in cloud computing infrastructure, comprising the steps of: initiating, at each of plurality of application nodes, a first process by one of at least one administration node, wherein the first process initiated is a network monitoring process entity (NMP); obtaining, at each of the plurality of application nodes, configuration information by the first process from a configuration database of the at least one administration node and creating a process list to be initiated on any of the application node on which the first process is operating, wherein the at least one administration node is further configured to store a predefined mapping relationship of a plurality of processes and a process identifier associated with each of the plurality of processes, and wherein the plurality of processes are capable of being executed on the plurality of application nodes; initiating, at each of the plurality of application nodes, at least one process other than the first process through a first procedure implemented on each of the plurality of application nodes, wherein the first process on each of the plurality of application nodes determines the process information of all the processes initiated on any of the application node on which the first process is operating, and wherein the first procedure is an asynchronous event-based procedure configured to initiate at least one process during a system boot and stop the at least one process initiated during a system shutdown, and wherein each application node hosting the at least one process other than the first process is configured to store a predefined mapping relationship of the at least one process and a process identifier associated with the at least one process; monitoring, at each of the plurality of application nodes, the process identifier and an operational status of the at least one process other than the first process, through the first procedure, by the first process, wherein the first procedure is configured to monitor the at least one process initiated while the system of the application node, on which the first process is initiated, is still running, wherein the monitoring the operational status includes monitoring either the at least one process experiencing an operating failure or the at least one process experiencing work load greater than a predefined threshold; and communicating, at each of the plurality of application nodes, the operational status of the at least one process other than the first process to the at least one administration node, wherein the administration node instructs the first process of other application node to initiate a new process other than the first process on the other application node based on the operational status of the at least one process other than the first process of the application node.

8. The method as claimed in claim 7, further comprising: initiating the network monitoring process entity as the first process on each of the plurality of application nodes by a management process module of one of the at least one administration node.

9. The method as claimed in claim 8, further comprising: continuously monitoring the operational status of all the processes initiated by the network monitoring process entity on any of the application node on which the first process is operating.

10. The method as claimed in claim 9, further comprising: communicating the operational status and process information to at least one of the administration node by the network monitoring process entity of each of the plurality of application nodes.

11. The method as claimed in claim 10, further comprising: communicating the received operational status to all the other application nodes by the at least one administration node.

12. A cloud computing apparatus comprising: a networking interface, connected to at least one administration node and at least one other cloud computing apparatus in a cloud computing infrastructure; a cloud platform thin layer entity, connected with the networking interface, and configured to perform: initiating, a first process on the cloud computing apparatus by one of the at least one administration node, wherein the first process initiated is a network monitoring process entity (NMP); obtaining, configuration information by the first process from a configuration database of one of the at least one administration node and creating a process list to be initiated on any of the application node on which the first process is operating, wherein the at least one administration node is further configured to store a predefined mapping relationship of a plurality of processes and a process identifier associated with each of the plurality of processes, and wherein the plurality of processes are capable of being executed on the plurality of application nodes; initiating, at least one process other than the first process through a first procedure implemented on each of the plurality of application nodes, wherein the first process on each of the plurality of application nodes determines the process information of all the processes initiated on any of the application node on which the first process is operating, and wherein the first procedure is an asynchronous event-based procedure configured to initiate at least one process during a system boot and stop the at least one process initiated during a system shutdown, and wherein each application node hosting the at least one process other than the first process is configured to store a predefined mapping relationship of the at least one process and a process identifier associated with the at least one process; monitoring, the process identifier and an operational status of the at least one process other than the first process, through the first procedure, by the first process, wherein the first procedure is configured to monitor the at least one process initiated while the system of the application node, on which the first process is initiated, is still running, wherein the monitoring the operational status includes monitoring either the at least one process experiencing an operating failure or the at least one process experiencing work load greater than a predefined threshold; and communicating, the operational status of the at least one process other than the first process to one of the at least one administration node, wherein the administration node instructs the first process of other application node to initiate a new process other than the first process on the other application node based on the operational status of the at least one process other than the first process of the application node.

\* \* \* \* \*